Oct. 18, 1932.   S. E. BOYNTON   1,882,755
METHOD OF PRODUCING ASSEMBLING FIXTURES
Original Filed March 6, 1929
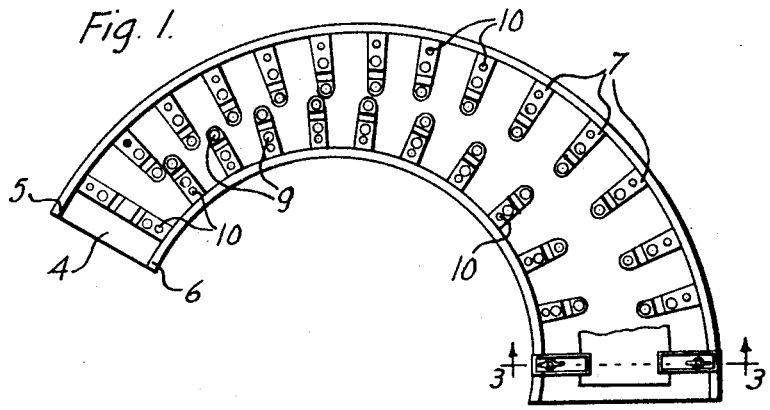
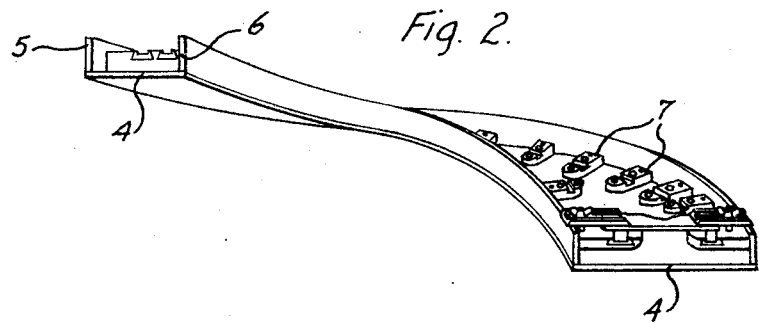
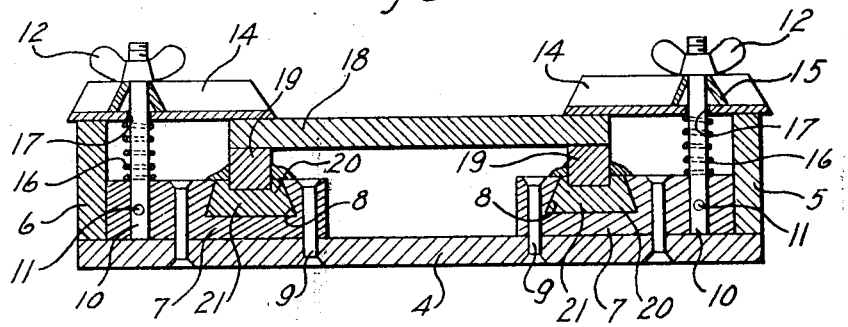
Inventor
Stanley E. Boynton.
By E. R. Moynihan
Attorney.

Patented Oct. 18, 1932

1,882,755

UNITED STATES PATENT OFFICE

STANLEY E. BOYNTON, OF ELIZABETH, NEW JERSEY, ASSIGNOR TO WESTERN ELECTRIC COMPANY, INCORPORATED, OF NEW YORK, N. Y., A CORPORATION OF NEW YORK

METHOD OF PRODUCING ASSEMBLING FIXTURES

Original application filed March 6, 1929, Serial No. 344,882. Divided and this application filed March 1, 1930. Serial No. 432,385.

This invention relates to methods of producing assembling fixtures, and more particularly to a method of producing fixtures for accurately positioning irregular shaped members while they are being assembled with other parts.

This invention is a division of my copending application, Serial No. 344,882, filed March 6, 1929 for which Patent No. 1,815,230 was granted July 21, 1931.

The assembling of irregularly shaped parts such as horns of the type disclosed in U. S. Patent No. 1,852,793 granted to D. G. Scrantom, April 5, 1932, necessitates the use of an assembling fixture which will accurately align certain of the parts with other parts to be assembled therewith. Ordinarily, the cost of producing such assembling fixture is comparatively great due to the fact that it is necessary to have highly skilled workmen who must be exceedingly careful to align properly the parts of the fixture and secure them in place.

An object of the present invention is to provide a simple, inexpensive and efficient method of producing assembling fixtures.

Accordingly one embodiment of this invention contemplates producing such assembling fixture by shaping a major member approximately to a desired conformation, securing therein a plurality of positioning members having slots cut therein, placing in the slots a master form of the exact shape and size of the member which the assembling fixture is to hold, and thereafter pouring molten metal or other moldable material around the sides of the master form in the slots, permitting this metal to harden, and thereafter removing the master form.

Other features and advantages of the invention will become apparent from the following detailed description of one embodiment thereof, reference being had to the accompanying drawing wherein.

Fig. 1 is a plan view of an apparatus for securing a plurality of parts in fixed relation while they are being permanently secured to each other, certain parts being broken away for the purpose of clarifying the disclosure;

Fig. 2 is an elevational view of the apparatus shown in Fig. 1, and

Fig. 3 is an enlarged sectional view taken on the line 3—3 of Fig. 1 in the direction of the arrows.

Referring now to the drawing wherein like reference characters designate the same parts throughout the several views, the numeral 4 designates a member which is formed in substantially the shape of a section of a tapered spiral, to which side members 5 and 6 are secured in any well known manner. A plurality of members 7—7 having dove-tailed slots 8—8 adjacent the inner ends thereof are secured to the member 4 by a plurality of rivets 9—9 positioned at opposite sides of the dove-tailed slots 8. Mounted in the members 7—7 adjacent the outer ends thereof are threaded posts 10—10 secured in the members 7—7 by means of pins 11—11. The upper ends of the posts 10—10 are threaded to receive wing nuts 12—12 for moving channel shaped clamping members 14 along the posts 10, a hollow conical washer 15—15 being interposed between the web of each of the clamping members 14 and the nut 12. Each of the clamping members is slotted at 17 to permit the passage therethrough of the post 10 and a spring 16 is interposed between the member 7 and the clamping member for normally urging the clamping member upwardly away from the member 7.

The hereinbefore described fixture having been formed and assembled, a master form comprising a member 18 to which are attached metal corner strips 19—19 having exactly the desired conformation is placed under the clamping members 14—14 and loosely positioned thereby in a manner such that the corner strips 19—19 of the master form are positioned in the dove-tailed slots 8—8 of the positioning members 7. If the slots 8—8 are in perfect alignment, the strips 19—19 will rest on the bottoms of the slots throughout their length, but ordinarily the inaccuracies of the slots will cause the strips to be spaced from the bottoms of the slots as indicated at 21 in Fig. 3. The master form having been placed in this position an easily fusible metal substance preferably that known as Babbitt metal is poured into the dove-tailed slots 8—8 and caused to form about the corner pieces 19—19 of the master form. After the Babbitt metal has solidified in the slots the master form is removed, leaving a member 20 of Babbitt metal in each of the positioning members so shaped that a line drawn through them will follow exactly the conformation of the corner strips of the master form.

It is believed that a clear understanding of the features of this invention will become more apparent from the following description of the use of the apparatus. In assembling irregularly shaped articles a clamping device for holding the articles is oftimes required; this is particularly true in assembling the parts of the plywood horn described and claimed in the patent to D. G. Scrantom, above referred to. A device of the character described hereinbefore was devised for fulfilling such a want and is used in the following manner. The wooden corner pieces of the horn, having been formed and treated to retain their desired conformation which corresponds exactly to the shape of the herein described master form, are placed in the grooves formed by the master form in the Babbitt metal members 20. Glue is then applied to the corner pieces and a sheet of plywood cut to a desired shape, but not formed to follow the spiral conformation desired, is placed over the corner pieces and clamped thereto by means of the clamps 14 and held in place thereby until the glue has completely dried, whereupon the wing nuts 12 are loosened and the spring 16 will force the clamps 14 upwardly so that the assembled section of the horn may be removed.

It is to be understood that the method of the present invention is not limited to the specific application thereof herein illustrated and described, but is capable of numerous other applications within the scope of the appended claims.

What is claimed is:

1. A method of forming a fixture for positioning articles to be assembled, which consists in shaping a base member approximately to the conformation of a master form, individually securing in said member a plurality of spaced recessed members, positioning the master form in spaced relation to the base member, and molding to each of said recessed members a positioning element recessed in predetermined alignment with adjacent positioning elements.

2. A method of forming a fixture for positioning articles to be assembled, which consists in preliminarily shaping a base member approximately to the conformation of a master form, individually mounting a plurality of spaced recessed members on the base member, placing a master form of the desired conformation in the recesses, and molding in the recesses and around the master form a plurality of positioning elements recessed in alignment with the desired conformation.

3. A method of forming a fixture for positioning articles to be assembled, which consists in preliminarily shaping a base member approximately to the conformation of a master form, securing in the base member at spaced intervals a plurality of recessed members, positioning a master form of the desired conformation in the recesses, molding in the recesses and in engagement with the master form metal positioning elements recessed in alignment with the master form, cooling the positioning elements, and removing the master form.

4. A method of forming a fixture for positioning articles to be assembled, which consists in shaping a base member approximately to the conformation of a master form, securing in the base member a plurality of recessed members, positioning in the recesses a master form of the desired conformation and having a depending portion narrower than the recesses, allowing the depending portion of the master form to unrestrainedly position itself with respect to the transverse dimension of the recesses, and molding in the recesses and around the depending portion of the master form a plurality of positioning elements recessed in alignment with the desired conformation.

In witness whereof, I hereunto subscribe my name this twentieth day of February A. D., 1930.

STANLEY E. BOYNTON.